(12) United States Patent
Angler et al.

(10) Patent No.: US 11,075,554 B2
(45) Date of Patent: Jul. 27, 2021

(54) ROTOR FOR A PERMANENT MAGNET SYNCHRONOUS MACHINE, POLE GAP ROD FOR SUCH A ROTOR, AND METHOD FOR PRODUCING SUCH A ROTOR

(71) Applicant: Siemens Aktiengesellschaft, Munich (DE)

(72) Inventors: Daniel Angler, Grossbardorf (DE); Michael Bzdziuch, Bad Königshofen (DE); Rainer Eckert, Bad Neustadt/Herschfeld (DE); Andreas Kraus, Sondheim (DE); Jürgen Seufert, Bad Neustadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 438 days.

(21) Appl. No.: 16/075,502

(22) PCT Filed: Nov. 10, 2016

(86) PCT No.: PCT/EP2016/077256
§ 371 (c)(1),
(2) Date: Aug. 3, 2018

(87) PCT Pub. No.: WO2017/133800
PCT Pub. Date: Aug. 10, 2017

(65) Prior Publication Data
US 2019/0074737 A1 Mar. 7, 2019

(30) Foreign Application Priority Data
Feb. 4, 2016 (EP) .................................. 16154281

(51) Int. Cl.
*H02K 1/27* (2006.01)

(52) U.S. Cl.
CPC ......... *H02K 1/278* (2013.01); *H02K 2201/06* (2013.01)

(58) Field of Classification Search
CPC ........................... H02K 1/278; H02K 2201/06
(Continued)

(56) References Cited

U.S. PATENT DOCUMENTS

| 5,323,078 A | 6/1994 | Garcia |
| 7,202,582 B2 | 4/2007 | Eckert et al. |

(Continued)

FOREIGN PATENT DOCUMENTS

| CN | 200944541 Y | 9/2007 |
| CN | 102684339 A | 9/2012 |

(Continued)

OTHER PUBLICATIONS

PCT International Search Report and Written Opinion of International Searching Authority dated Jan. 16, 2017 corresponding to PCT International Application No. PCT/EP2016/077256 filed Nov. 10, 2016.

*Primary Examiner* — Terrance L Kenerly
(74) *Attorney, Agent, or Firm* — Henry M. Feiereisen LLC

(57) ABSTRACT

The invention relates to a rotor (2) for a permanent magnet synchronous machine, comprising a laminated core (6) arranged on a shaft (4) extending in the axial direction (A), a plurality of poles (14) being arranged around the periphery of the laminated core, wherein at least one magnet (10) is provided per pole. In order to ensure particularly good prevention against slipping of the magnets, pole gap rods (12) are positioned between the poles (14) in such a way that, in the peripheral direction, each magnet (10) is applied, by a first side (16a) and an opposing second side (16b), to a respective pole gap rod (12).

18 Claims, 3 Drawing Sheets

(58) Field of Classification Search
USPC .................................................. 310/156.08
See application file for complete search history.

(56) References Cited

U.S. PATENT DOCUMENTS

| | | | |
|---|---|---|---|
| 7,687,957 B2 * | 3/2010 | Ochiai | H02K 1/278 |
| | | | 310/156.08 |
| 7,692,356 B2 | 4/2010 | Bott et al. | |
| 7,712,367 B2 | 5/2010 | Eckert et al. | |
| 8,072,103 B2 | 12/2011 | Eckert et al. | |
| 8,159,099 B2 | 4/2012 | Duempert et al. | |
| 8,188,628 B2 | 5/2012 | Baehr et al. | |
| 9,450,465 B2 | 9/2016 | Eckert et al. | |
| 9,941,758 B2 | 4/2018 | Geis et al. | |
| 2002/0063486 A1 | 5/2002 | Huth | |
| 2007/0035192 A1 | 2/2007 | Jeon et al. | |
| 2008/0093945 A1 | 4/2008 | Gruenhagen | |
| 2008/0290761 A1 | 11/2008 | Eckert et al. | |
| 2009/0001839 A1 | 1/2009 | Masayuki et al. | |
| 2009/0315424 A1 | 12/2009 | Vollmer | |
| 2009/0322174 A1 | 12/2009 | Grossmann et al. | |
| 2014/0009024 A1 | 1/2014 | Heim | |
| 2016/0294244 A1 | 10/2016 | Baehr et al. | |
| 2016/0315514 A1 | 10/2016 | Eckert et al. | |

FOREIGN PATENT DOCUMENTS

| | | | | |
|---|---|---|---|---|
| CN | 202535176 U | | 11/2012 | |
| CN | 103545997 A | | 1/2014 | |
| CN | 104113152 A | | 10/2014 | |
| CN | 104838793 A | | 5/2015 | |
| CN | 105048677 A | | 11/2015 | |
| DE | 102006049866 | * | 4/2008 | ............ H02K 1/007 |
| EP | 1 193 826 A2 | | 4/2002 | |
| EP | 1 914 864 A2 | | 4/2008 | |
| EP | 2 073 352 A1 | | 6/2009 | |
| EP | 2 139 100 A1 | | 12/2009 | |
| JP | S61138375 U | | 8/1986 | |
| JP | H099539 | | 1/1997 | |
| JP | 2004236373 A | | 8/2004 | |
| JP | 2005354768 A | | 12/2005 | |
| JP | 2007043900 A | | 2/2007 | |
| JP | 2011101491 A | | 5/2011 | |
| JP | 2014003795 A | | 1/2014 | |
| WO | WO 2008049718 A1 | | 5/2008 | |

* cited by examiner

ROTOR FOR A PERMANENT MAGNET SYNCHRONOUS MACHINE, POLE GAP ROD FOR SUCH A ROTOR, AND METHOD FOR PRODUCING SUCH A ROTOR

CROSS-REFERENCES TO RELATED APPLICATIONS

This application is the U.S. National Stage of International Application No. PCT/EP2016/077256, filed Nov. 10, 2106, which designated the United States and has been published as International Publication No. WO 2017/133800 and which claims the priority of European Patent Application, Serial No. 16154281.6, filed Feb. 4, 2016, pursuant to 35 U.S.C. 119(a)-(d).

BACKGROUND OF THE INVENTION

The invention relates to a rotor for a permanent magnet-excited synchronous machine, comprising a laminated core arranged on a shaft extending in the axial direction, a plurality of poles being arranged around the periphery of the laminated core, wherein at least one magnet is provided per pole. The invention further relates to a pole gap rod for such a rotor, and a method for producing such a rotor.

In principle there are two possibilities of equipping rotors for synchronous machines with permanently excited magnets: with internal magnets, in which the magnets are positioned in slots in the rotor laminations, and with external magnets, in which the magnets are fixed around the periphery of the rotor. With a rotor with external magnets, the magnets are generally fixed in their position by a suitable adhesive and/or by a binding with corresponding prestress.

During operation of the synchronous machine upon rotation of the rotor, the magnets are exposed to strong centrifugal forces. In addition to the centrifugal forces, shearing forces act on the magnets, which may cause their offset in the case of an inadequate fixing of the magnets. The shearing forces occur in particular with acceleration and braking processes and also with a vibration and shock load. In such cases, a binding with prestress can only hold the magnet compound under certain conditions.

The magnets can be embodied inter alia as segment magnets. Segment magnets with two curved surfaces are described in EP 2 073 352 A1 for instance.

In order to counteract the shearing forces, a suitable adhesive is used with the segment magnets which are arranged around the periphery of laminated cores with cylindrical rotor laminations. Since the magnets have to be secured against slipping, the adhesion process is laborious. Alternatively, the laminated cores have lateral stop lugs between the poles. With this embodiment, a staggering of the magnets has proven to be difficult, however, since the binding is drawn into the gap between the magnets and the binding is thus impaired.

A further possibility of fixing the permanent magnets of a rotor via clamping rings is described in U.S. Pat. No. 5,323,078 A.

SUMMARY OF THE INVENTION

The object underlying the invention is to permit an arrangement of the magnets of a rotor, in which a particularly good securing of the magnets against slipping is ensured.

The object is achieved in accordance with the invention by a rotor for a permanent magnet-excited synchronous machine, comprising a laminated core arranged on a shaft extending in the axial direction, a plurality of poles being arranged around the periphery of the laminated core, wherein at least one magnet is provided per pole, wherein pole gap rods are positioned between the poles such that, when viewed in the peripheral direction, each magnet rests with a first side and an opposing second side on a pole gap rod in each case and wherein the pole gap rods have at least two, preferably a plurality of poles being arranged around the periphery of segments which, viewed in the axial direction, are offset with respect to one another.

The invention is based on the idea that a reliable securing of the magnets against shearing or slipping is ensured, by pole gap rods which laterally support the magnets being provided between the row of poles. Here each magnet is in contact with two pole gap rods with its first side and its second side. Each pole gap rod in turn supports the magnets in particular of two poles. The fact that the pole gap rods are arranged between the poles and each magnet rests on both sides over a large area or at least at points on a pole gap rod means that the pole gap rods prevent the magnets from shifting along the surface of the laminated core as a result of the shearing forces.

A staggering of the magnets is moreover possible thanks to the pole gap rods. For this purpose, the pole gap rods have at least two, preferably a plurality of segments, which, when viewed in the axial direction, are offset with respect to one another. The stagger angle of the poles is determined here in particular by the shape of the pole gap rods.

The pole gap rods are components which are separate from the magnets and the rotor laminations and which are embodied in particular from a material which differs from that of the magnets and the rotor laminations. Here the pole gap rods are spacers, which fix the magnets into their respective position by means of contact with the magnets. The shape and size of the pole gap rods are matched here to the shape, size and arrangement of the magnets on the laminated core.

The pole gap rods can be realized in multiple parts, so that in particular a plurality of pole gap rods are arranged one behind the other between two poles in the axial direction. With respect to a reduction in the number of pole gap rods and the effort involved in attaching the pole gap rods, only one pole gap rod, which is preferably at least as long as the poles, is provided between each two poles.

In order that the magnetic properties of the rotor are not impaired, the pole gap rods are advantageously embodied from a magnetically non-conducting material, e.g. plastic, aluminum etc.

The pole gap rods are preferably fixed to the laminated core. This ensures that the pole gap rods do not slip and offers a particularly secure hold for the magnets. Expediently, a form-fit connection is produced for this purpose, by pins being provided on the pole gap rods, which pins, in the assembled state of the rotor, are directed radially inward and engage in pole gaps between the poles. In the event that upon assembly of the rotor the magnets are firstly fixed to the surface by means of adhesive tape, the pins are interrupted in particular at points at which the adhesive tape is applied, so that the adhesive tape is not damaged.

With respect to a particularly secure hold of the magnets, according to a preferred embodiment the pole gap rods have full surface contact with the first and the second side of the magnets.

According to an alternative preferred embodiment, the pole gap rods have a plurality of webs which extend at right angles to the embodiment, by way of which webs they make contact with the magnets. Here the pole gap rods support the sides of the magnets at points or across part of the lateral length at one or a plurality of points. This embodiment makes particularly conservative use of materials.

The magnets are preferably embodied as segment magnets. Segment magnets are generally arranged around cylindrical laminated cores with a circular cross-section of the individual laminations, so that without further safety measures the risk of the magnets slipping is great, as result of which the requirements for a secure hold of such segment magnets is particularly high.

According to a preferred embodiment, adhesive tape is applied to the laminated core below the magnets. This adhesive tape is applied around the periphery of the laminated core in front of the pole gap rods and the magnets, in particular in individual rings, and only serves to fix the magnets or pole gap rods. With respect to the centrifugal forces and/or the shearing forces, the adhesive tape in particular has no effect.

According to a further preferred embodiment, the arrangement of magnets and pole gap rods is bound. In this way, the magnets and the pole gap rods are secured against the centrifugal forces during operation of the rotor. In the case of laminated rotors, end disks are generally used to receive a binding start and/or a binding end. The pole gap rods can be used here to ensure the function of the end disk. The end disk can therefore be omitted.

Expediently, the pole gap rods have a plurality of clearances which open radially outward. A profiled surface provided with a plurality of open clearances is thus created. The advantage of such profiling is that the pole gap rods can be used for balancing, in particular as fasteners for a balancing kit.

The object is further achieved in accordance with the invention by a pole gap rod for a rotor as claimed in one of the afore-cited embodiments.

The object is finally achieved in accordance with the invention by a method for producing such a rotor for a permanent magnet-excited synchronous machine, in which:
 the laminated core is joined to the shaft,
 adhesive tape for prefixing the magnets is applied around the periphery of the laminated core,
 the pole gap rods and the magnets are arranged, and
 the rotor is bound.

The advantages and preferred embodiments already cited with respect to the rotor can be transferred analogously to the pole gap rod and the manufacturing method.

The pole gap rods are preferably firstly fixed to the laminated core, in particular with a form fit. The magnets, magnetized or non-magnetized, are then distributed axially between the pole gap rods. Other sequences are however also conceivable in terms of the distribution of pole gap rods and the magnets on the laminated core. With non-magnetized magnets, these are finally magnetized after binding.

BRIEF DESCRIPTION OF THE DRAWING

An exemplary embodiment of the invention will be described in greater detail with reference to a drawing. In the figures.

DETAILED DESCRIPTION OF PREFERRED EMBODIMENTS

Figure 1:
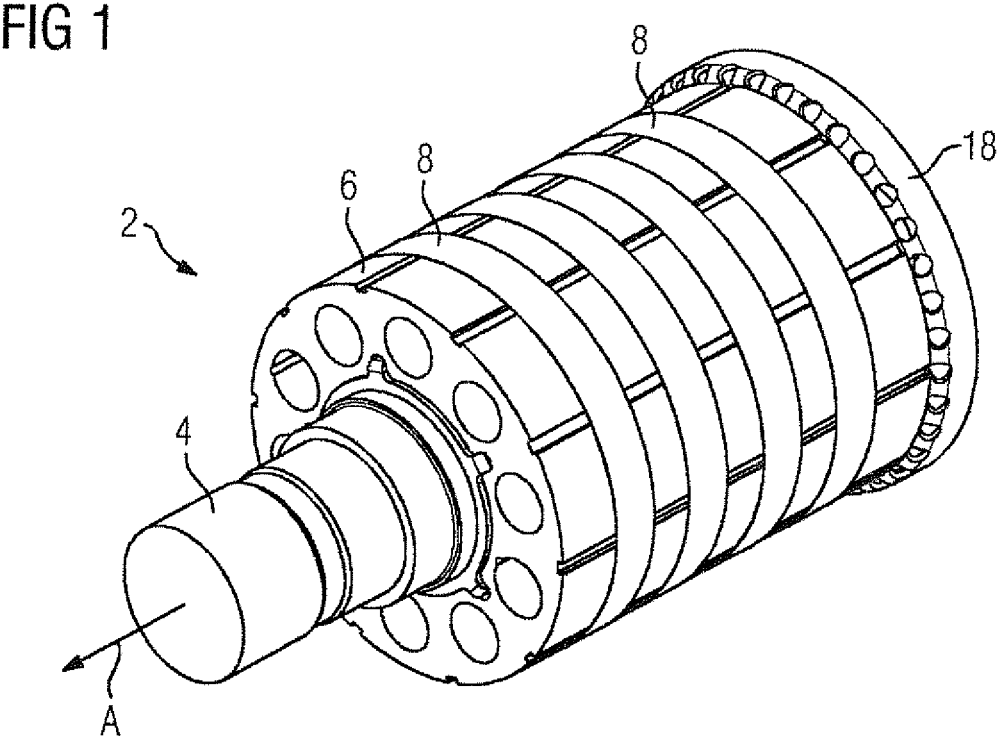
FIG. 1 shows a perspective representation of a rotor comprising a laminated core with an adhesive tape applied.

The same reference characters have the same meaning in the various figures.

Figure 2:
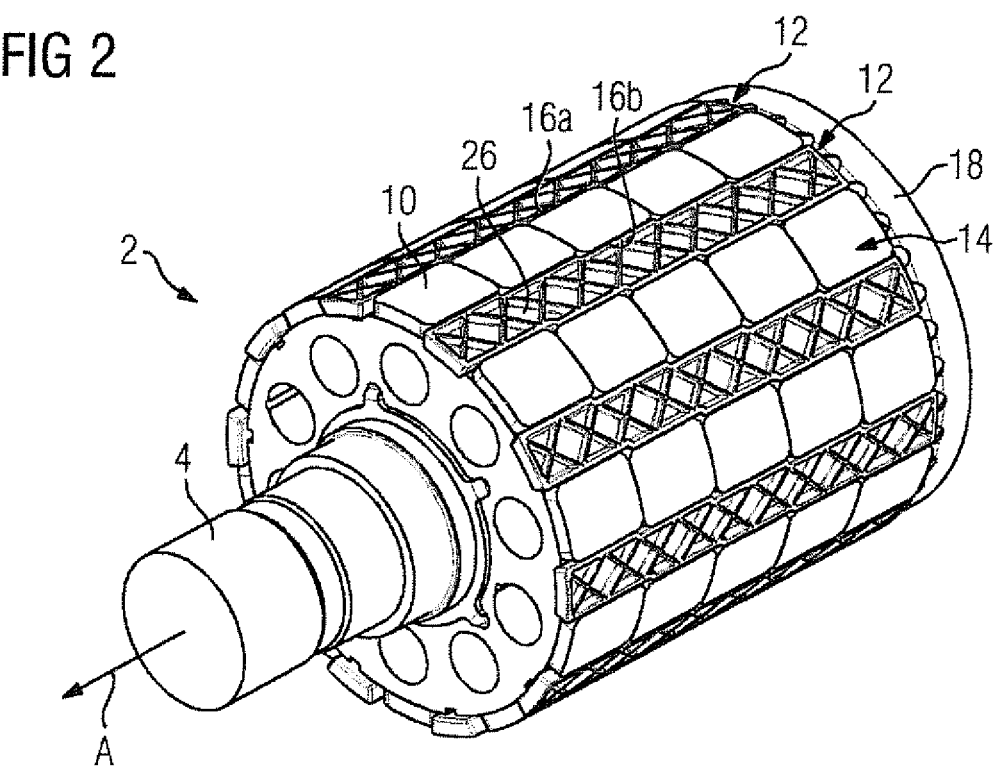
FIG. 2 shows a perspective representation of the laminated core according to FIG. 1 with fixed pole gap rods and magnets.

FIG. 1 and FIG. 2 show the step-by-step installation of an inventive rotor 2 for use in a permanent magnet-excited synchronous machine (not shown in further detail here) in particular in a servomotor. The rotor 2 comprises a shaft 4 which extends in an axial direction A and a laminated core 6.

The laminated core 6 is attached to the shaft 4 in a first manufacturing step. In the next step, adhesive tape 8 is applied around the periphery of the laminated core 6 in a plurality of ring-shaped strips. The adhesive tape 8 serves only to fix permanently-excited magnets 10 and possibly pole gap rods 12, which in a third step are distributed on the periphery of the laminated core 6. In this exemplary embodiment, the magnets 10 are realized as segment magnets and form a plurality of rows of poles 14 in the axial direction.

The pole gap rods 12 which prevent the magnets 10 from slipping are arranged between the poles 14. The pole gap rods 12 are all of equal width and length here and are embodied from a magnetically non-conducting material, e.g. aluminum or plastic. Each magnet 10 has a first side 16a which extends in the axial direction A and an opposing second side 16b which extends in the axial direction A. The pole gap rods 12 are positioned here such that each magnet 10 rests with its first side 16a on a pole gap rod 12 and with its second side 16b on a further pole gap rod 12. In the exemplary embodiment according to FIG. 1 and FIG. 2, the magnets 12 rest over their full surface with their first side 16a and second side 16b, i.e. there is contact between the magnet 10 and the adjacent pole gap rod 12 in particular across the entire length of the sides 16a, 16b.

In a last manufacturing step, the rotor 2 is bound by means of a binding (not shown in further detail here). An end disk 18 is provided for receiving the binding start or binding end. Its function can however be assumed by the pole gap rods 12.

Figure 3:
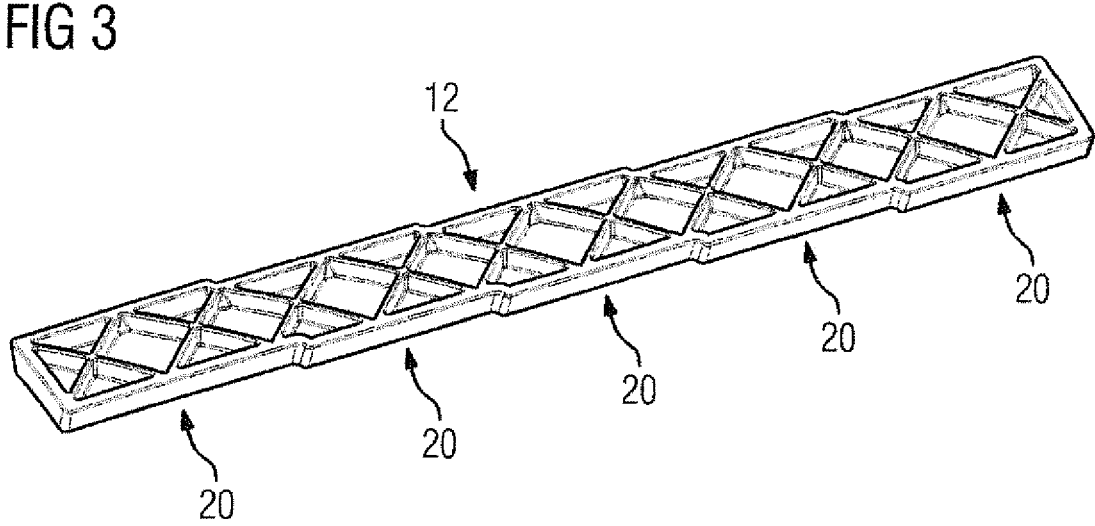
FIG. 3 shows a perspective representation of a first embodiment variant of a pole gap rod.
Figure 4:
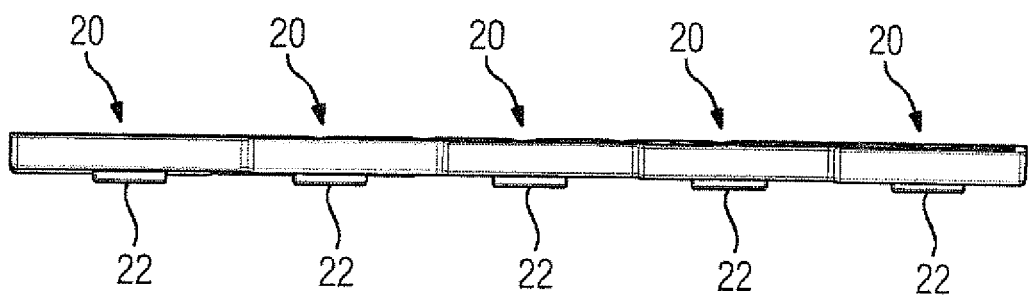
FIG. 4 shows a side view of a pole gap rod according to FIG. 3.

A first embodiment variant of the pole gap rods 12 is shown in FIG. 3 and FIG. 4. The pole gap rods 12 have a plurality of segments 20, which are offset with respect to one another when viewed in the axial direction A. Furthermore, the pole gap rods 12 have pins 22, which are directed radially inward and fix the pole gap rods 12 to the laminated core 6 by way of a form-fit connection. On their outer side, the pole gap rods 12 have a grid-type profiling.

Figure 5:
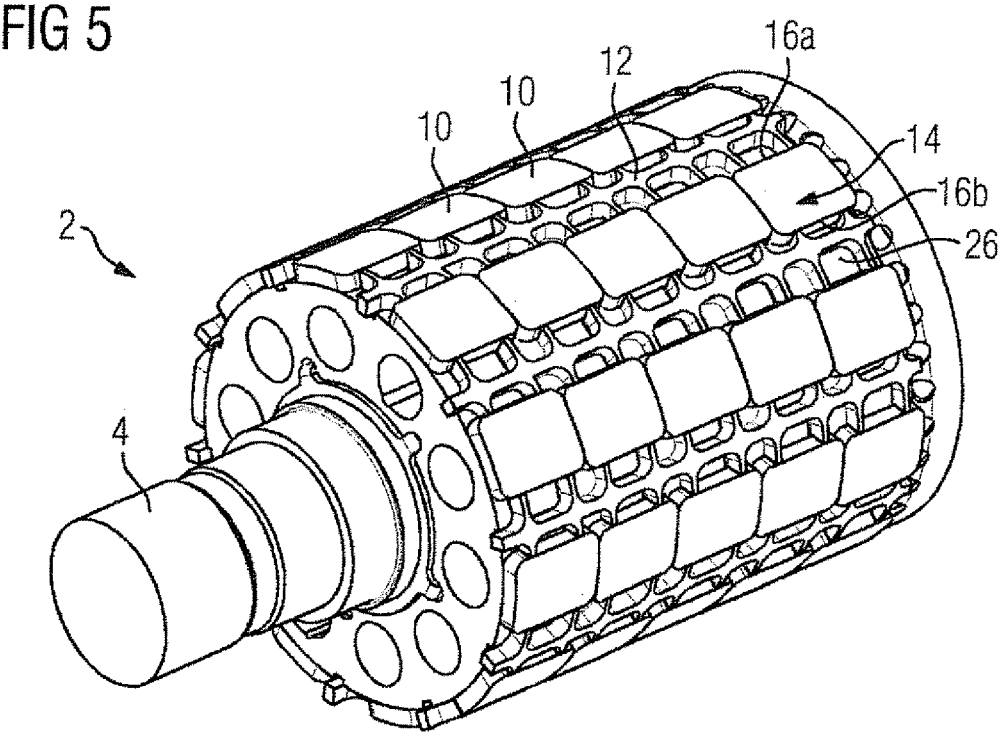
FIG. 5 shows a perspective representation of a second rotor with a second embodiment variant of a pole gap rod.
Figure 6:
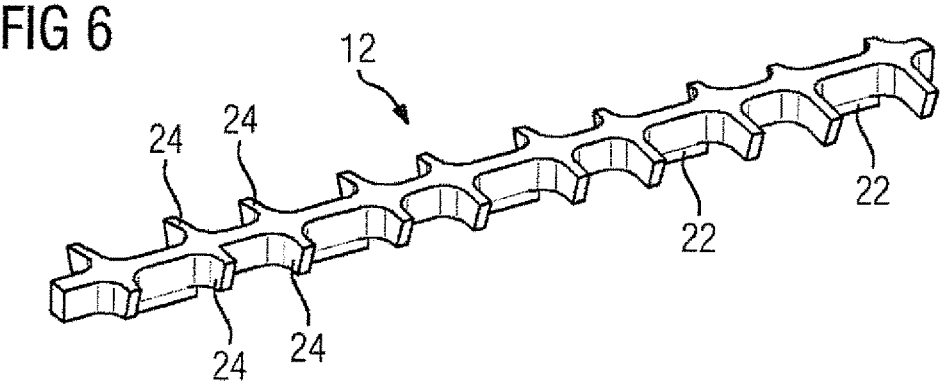
FIG. 6 shows a perspective representation of a pole gap rod according to FIG. 5.
Figure 7:
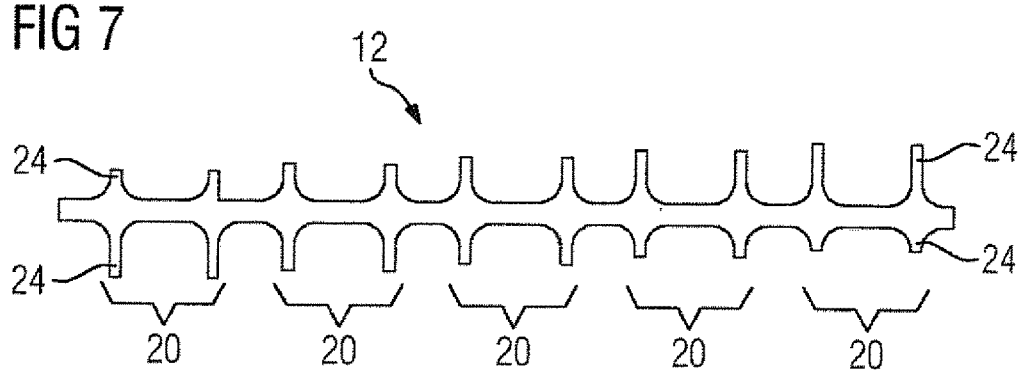
FIG. 7 shows a top view of a pole gap rod according to FIG. 5 and FIG. 6.

A second embodiment variant of the pole gap rods 12 is apparent from FIG. 5 to FIG. 7. The pole gap rods 12 here have a plurality of webs 24 which extend at right angles to the axial direction A, by way of which they contact the sides 16a, 16b of the magnets 10 at points. In the further sense, the pole gap rods 12 thus have a fish bone shape. In the exemplary embodiment shown, each side 16a, 16b of a magnet 10 is supported by two webs 24. As is apparent in particular from FIG. 7, the pole gap rods 12 of the second embodiment variant likewise have a plurality of segments 20, wherein the length of the webs 24 is varied between the different segments 20 so that a staggering of the magnets 10 is permitted in the axial direction 10.

The pole gap rods 12 of both embodiment variants moreover have a plurality of clearances 26 as a result of their profiled surface in the assembled state of the rotor 2, said clearances being open at least radially outward (see FIG. 2 and FIG. 5). These hollow clearances can be used in particular to balance the rotor 2.

What is claimed is:

1. A rotor for a permanent magnet-excited synchronous machine, said rotor comprising:
    a shaft extending in an axial direction;
    a laminated core arranged on the shaft;
    a plurality of poles arranged around a periphery of the laminated core, with at least one magnet being provided per pole;
    pole gap rods positioned between the poles such that, when viewed in a peripheral direction, each magnet rests with a first side and an opposing second side on an associated one of the pole gap rods, said pole gap rods including at least two continuous segments which are arranged in the axial direction and offset with respect to one another in the peripheral direction, thereby enabling a staggered arrangements of the poles when viewed in the axial direction.

2. The rotor of claim 1, wherein each segment of the pole gap rods is at least as long as an associated pole.

3. The rotor of claim 1, wherein the pole gap rods are made of a magnetically non-conducting material.

4. The rotor of claim 1, wherein the pole gap rods are fixed to the laminated core.

5. The rotor of claim 1, wherein the pole gap rods include pins which are directed radially inward and engage in pole gaps between the poles.

6. The rotor of claim 1, wherein the pole gap rods have full surface contact with the first and the second side of the magnets.

7. The rotor of claim 1, wherein the pole gap rods include a plurality of webs, which extend at a right angle to the axial direction, for contact of the pole gap rods with the magnets.

8. The rotor of claim 1, wherein the magnet is embodied as a segment magnet.

9. The rotor of claim 1, further comprising an adhesive tape applied to the laminated core below the magnets.

10. The rotor of claim 1, wherein an arrangement of the magnets and the pole gap rods is bound.

11. The rotor of claim 1, wherein the pole gap rods have a plurality of clearances which open radially outward.

12. A pole gap rod for a rotor of a permanent magnet-excited synchronous machine having a plurality of poles arranged around a periphery of a laminated core, with at least one magnet being provided per pole, said pole gap rod comprising at least two continuous segments which are arranged in an axial direction of the rotor and offset with respect to one another in a peripheral direction of the rotor, thereby enabling a staggered arrangement of the poles disposed between peripherally adjacent pole gap rods when viewed in the axial direction.

13. The pole gap rod of claim 12, wherein the pole gap rod has an axial length which is at least as long as an axial length of a pole disposed on the periphery of the laminated core of the rotor.

14. The pole gap rod of claim 12, wherein the pole gap rod is made of a magnetically non-conducting material.

15. The pole gap rod of claim 12, further comprising pins which are directed radially inward and engage in pole gaps between poles arranged around the periphery of the laminated core of the rotor.

16. The pole gap rod of claim 12, further comprising a plurality of webs, which extend at a right angle to the axial direction, for contact of the pole gap rods with magnets arranged around the periphery of laminated core of the rotor.

17. The pole gap rod of claim 12, wherein the pole gap rod has a plurality of clearances which open radially outward.

18. A method for producing a rotor, comprising:
    joining a laminated core to a shaft extending in an axial direction;
    applying an adhesive tape around periphery of the laminated core for prefixing magnets on the laminated core;
    arranging pole gap rods and magnets around the periphery of the laminated core, wherein the pole gap rods are positioned between the magnets such that, when viewed in a peripheral direction, each magnet rests with a first side and an opposing second side on peripherally adjacent ones of the pole gap rods, said pole gap rods including at least two continuous segments which extend in the axial direction and are offset with respect to one another in the peripheral direction; and
    bounding the arrangement of the magnets and the pole gap rods.

* * * * *